United States Patent [19]

Montone

[11] 4,220,966
[45] Sep. 2, 1980

[54] DETERMINING BOUNDARIES OF A TRANSPARENT TUBE

[75] Inventor: Liber J. Montone, Reading, Pa.

[73] Assignee: Western Electric Company, Inc., New York, N.Y.

[21] Appl. No.: 934,661

[22] Filed: Aug. 17, 1978

[51] Int. Cl.² ............................................. H04N 7/18
[52] U.S. Cl. ................................... 358/101; 358/106; 358/107; 358/225; 356/239; 356/240
[58] Field of Search ................. 358/101, 106, 107, 93, 358/225; 356/239, 240

[56] References Cited

U.S. PATENT DOCUMENTS

| | | | |
|---|---|---|---|
| 3,565,536 | 2/1971 | Wuellner | 356/239 |
| 3,679,820 | 7/1972 | Montone | 358/107 |
| 4,121,247 | 10/1978 | Henry | 358/93 |
| 4,135,204 | 1/1979 | Davis | 358/101 |

*Primary Examiner*—Howard W. Britton
*Attorney, Agent, or Firm*—W. O. Schellin

[57] ABSTRACT

The inner wall of a cylindrical glass envelope is delineated by a combination of a diffused light source and peripheral shutters placed behind the envelope. The precise position of the shutters is adjusted to block some of the peripheral light from the source from reaching the envelope. When the article is viewed from the front, dark lines delineate the lateral extent of the inner wall of the envelope. With the help of such a delineation it is possible to check the accuracy of the assembly of contacts in a miniature mercury-wetted sealed contact switch relative to the inner surface of its glass envelope.

10 Claims, 4 Drawing Figures

DETERMINING BOUNDARIES OF A TRANSPARENT TUBE

TECHNICAL FIELD

The present invention relates to methods of and apparatus for determining boundaries of transparent tubes. The invention is particularly useful for inspecting miniature sealed contact switches, and determining the inner boundaries of a transparent tube used to seal the contact switches. Its description with respect to such switches is for illustrative purposes only and is not to be construed as limiting to the scope of the invention.

BACKGROUND OF THE INVENTION

Optical methods and apparatus have been used in the inspection of transparent articles. For instance, U.S. Pat. No. 3,565,536 to Wuellner et al discloses methods and apparatus for inspecting glass tubes. A combination of a diffused back lighting source and a video camera is used to detect voids in a glass wall. Also, several video cameras are grouped and disposed at different angles to scan the tube to be inspected as it is moved past the cameras. A void or air line is detected as an electrical output of the video cameras. The prior art patent further discusses that refractive characteristics adjacent the extremities of a quadrant differ from those near the light axis.

Heretofore it has been a problem to accurately determine the location of inner edges or walls of a transparent tube relative to its outside diameter. It is clearly possible, with the use of commercially available video equipment, to project an image of a transparent tube on a video screen. However, because of edge diffraction of light, the precise position of the inner walls of the tube relative to its outer confines remains obscure.

In the manufacture of some articles, however, it becomes desirable to measure dimensions from the inner wall of a glass tube. For instance, in the assembly of the miniature mercury-wetted sealed contact switches, contacts and a moving armature become sealed in a tubular glass envelope of relatively small diameter.

If the normal position of the armature within the tube is too close to the inner wall of the glass envelope, a change in the desired operating characteristics of the switch results. An inspection of assembled switches can identify marginal switches which tend to experience such a change in operating characteristics upon being placed in an operating environment.

Determining the position of the armature with respect to the outer wall of the switch is found not to be an accurate test for ascertaining such marginal switches. The wall thicknesses of the glass envelopes tend to vary among a group of switches. Particularly at the contact or pole piece end of the envelope, sealing the glass tube about the pole piece brings about significant changes in the roundness of the tube and also in its wall thickness.

It is, therefore, highly desirable to establish the position of the inner wall of a transparent tubular envelope with respect to the position of elements located within the envelope.

SUMMARY OF THE INVENTION

In accordance with the present invention, a method of determining an inner wall of a hollow cylindrical article transparent to at least some form of radiating energy comprises positioning the article with its longitudinal axis in front of a diffused source of such radiating energy. The article is oriented with a longitudinal axis thereof into a first plane perpendicular to a sensing axis between the source and a radiation sensor. A shutter partially blocks peripherably radiating energy from reaching the radiation sensor, whereby a black shadow line delineates the inner wall.

In an apparatus according to the invention an article holder is located in spaced relationship to a diffused energy source. The holder retains a transparent hollow cylindrical article in a position with its longitudinal axis perpendicular to a viewing axis. At least one shutter is located between the article and the energy source. The shutter has an inner edge substantially parallel to the longitudinal axis of the article. The edge is located in a plane perpendicular to the viewing axis. The position of the inner edge of the shutter laterally offset from the viewing axis blocks at least a portion of the energy radiating from the source. The blocked energy results in a dark line which delineates the inner wall of the article.

BRIEF DESCRIPTION OF THE DRAWING

Various aspects, advantages, and features will become understood from the detailed description which may be read in conjunction with the accompanying drawing, wherein.

DETAILED DESCRIPTION

Figure 1:
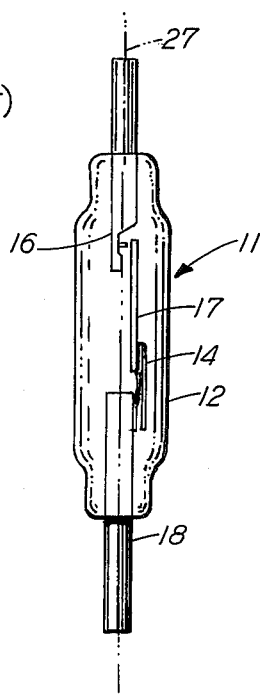
FIG. 1 is a side view of an envelope of a mercury-wetted sealed contact switch as it may appear to an observer without the benefit of the present invention.

Referring now to FIG. 1, there is shown an envelope assembly or article 11 of a prior art mercury-wetted sealed contact switch. The switch, however, is not shown in its entirety. The switch includes in addition to the article 11 a coil which surrounds the article 11.

Of particular interest in the article 11 is an envelope 12. The envelope 12 is substantially a hollow transparent cylinder, or in particular, a glass tube. Into each end of the envelope 12 is bonded an electrically and magnetically conductive element.

From one end a stem and armature assembly 14 extends into the envelope 12. From the other end a pole piece 16 extends into the envelope to be positioned adjacent to a free end of an armature 17 of the assembly 14. The armature 17 is resiliently hinged to a hollow stem 18 of the assembly 14.

In assembling the article 11, the stem and armature assembly 14 becomes positioned in relationship to the pole piece 16 and within the envelope 12. The ends of the envelope 12 are then heated to soften and eventually melt a portion of the glass. The melted glass flows around the stem 18 and the pole piece 16. Upon cooling the glass forms a bond with the stem 18 and the pole piece 16 to maintain their relative position with respect to each other. After having been assembled in the manner described, a predetermined quantity of mercury is injected into the envelope through the hollow stem 18. The envelope is then pressurized and sealed by a cross wire weld at the stem 18 outside of the envelope 12. The above assembly steps summarize known techniques for making mercury-wetted contact switches.

However, relatively small sizes of the articles 11 tend to cause problems when the armature 17 within the envelope 12 rests in a position too close to, or even against, the inner wall of the envelope 12. In viewing the article 11 without the help of the present invention, the inner wall of the envelope 12 is not readily discernible, as it is shown in FIG. 1. The polepiece 16 and the assembly 14 are clearly visible. Yet it is not possible to locate their positions in relationship to the inner wall of the envelope 12.

Figure 2:
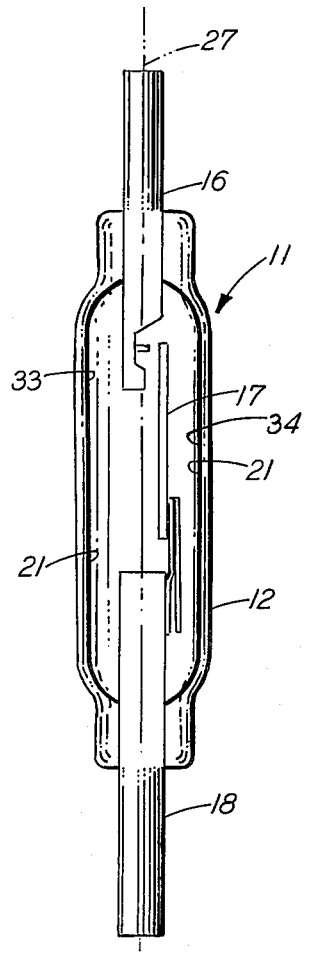
FIG. 2 is a side view of an envelope of a mercury-wetted sealed contact switch when viewed in accordance with principles of the present invention.

However, it has now been discovered to delineate the boundary of an inner surface or inner wall 21 of the envelope 12. In accordance with this discovery, it becomes possible to highlight the inner wall 21 by a dark shadow line as it is shown in FIG. 2. Such a delineation is achieved by an apparatus shown in FIG. 3 which is designated generally by the numeral 22.

The apparatus 22 uses a standard fluorescent light bulb 23 to generate diffused light. In the preferred embodiment an additional diffuser shield 24 is placed in front of the fluorescent bulb 23. The shield 24 can be of any of a number of commercially available materials, such as a pane of etched glass or translucent plastic sheet. The fluorescent bulb 23, appropriately connected to an electric power supply (not shown) and the additional shield 24 form a source 25 of diffused light for a uniformly lighted background. It should, however, be noted that the fluorescent bulb 23 without the additional shield 24 can supply sufficiently diffused light to achieve the advantages of this invention.

In front of the light source 25 and spaced from it by a convenient distance a holder 26 supports an article 11 to be inspected. The article 11 is mounted in the holder 26 to position a longitudinal axis 27 of the article perpendicular to a sensing or viewing axis 28. The viewing axis 28 is a line along which the article 11 is viewed by a sensor 29 when it is inspected to ascertain the correct position of the assembly 14 and the polepiece 16 with respect to each other and with respect to the envelope 12. The viewing axis is chosen to be perpendicular to the plane of the shield 24.

The sensor 29 is, in the preferred embodiment, a commercially available video camera. The camera is used in conjunction with a video screen 30 in accordance with known practices. Other sensors of radiating energy, or in particular light, may be used. An optical microscope, for instance, can also provide magnification of the envelope 12, which is only approximately 2.5 mm in diameter and 15 mm long. However, the preferred use of the video camera and screen 30 permits the simultaneous use of a measuring system, such as the one described in U.S. Pat. No. 3,679,820 to L. J. Montone. The measuring system is used to quantitatively inspect the article 11, after the boundary of the inner wall 21 has been delineated in accordance with this invention.

Figure 3:
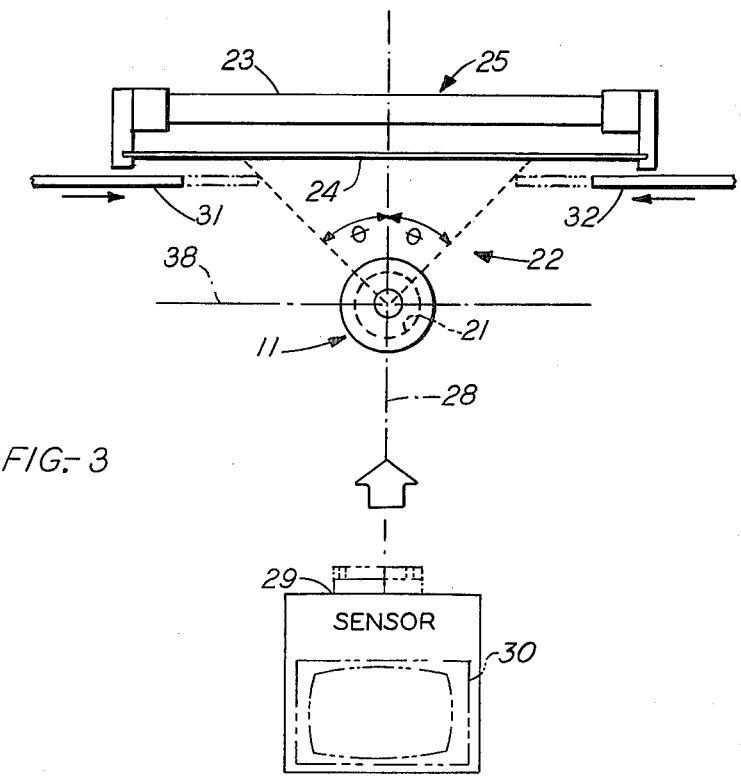
FIG. 3 is a plan view of an apparatus for inspecting the envelope of FIG. 2 in accordance with principles of the present invention.

When the article 11 is viewed from the direction indicated by the arrow in FIG. 3, the back lighting source 25 by itself does not delineate the inner wall 21 of the envelope 12. However, when, in addition, two shutters 31 and 32 are moved inwardly to become partially interposed between the source 25 and the article 11, the inner wall 21 of the envelope 12 becomes clearly delineated by a shadow line within the outer periphery of the envelope 12. Each shutter 31 or 32 generates a separate shadow line 33 or 34 on its respective side of the envelope 12. However, the lines 33 and 34 merge into each other at both ends of the envelope 12 to completely outline the inner wall 21. The quality of the delineation of the inner wall 21 can be optimized by moving the shutters into a certain preferred position.

This preferred position of the shutters 31 and 32 requires further explanation, in that it is, of course, critical to the present invention. Each shutter 31 or 32 has in the preferred embodiment a straight inner edge 36 or 37, respectively. These edges 36 and 37 extend parallel to the longitudinal axis 27 of the article 11. An angle, referred to in the drawing as angle $\theta$, exists between a plane common to one of the edges 36 or 37 and the longitudinal axis 27 of the article 11 and a plane common to the viewing axis 28 and the longitudinal axis 27 of the article 11.

When the shutters are adjusted inwardly toward the viewing axis 28, they begin to block peripherally incoming light emanating from the source 25. A shadow line, which appears to be an image of the edge of each shutter, begins to show where the inner wall 21 of the envelope 12 terminates.

The precise optical phenomenon of the shadow line is not known. However, it is believed to be a shadow image of the shutter distorted by diffraction and reflected into view off the inside surface of the inner wall 21. As the shutter 31, for instance, is moved further and the angle $\theta$ approaches approximately 55° to 45° the shadow line or dark delineation of the inner wall 21 becomes more pronounced. Then, as the shutter 31 is moved further toward the viewing axis 28, the shadow line begins to widen and to distort.

The widening is believed to be caused by an image of the shutters appearing and extending first on one side and then on both sides of the inner wall 21. At that point, a clear delineation of the inner wall 21 begins to disappear.

In FIG. 3, a top view of the article 11 also illustrates that an image reflection from the shutters 31 or 32 off the inner wall 21 is most narrow along a diametrical plane 38 perpendicular to the viewing axis 28. The dark lines 33 and 34 viewed as an image reflection off the inner wall 21 in approximately the plane 38 highlight the lateral extent of the inner wall 21, hence its diameter.

The angle $\theta$ is, therefore, considered critical only in its effect. As the invention is presently applied, an adjustment of the shutters to an optimum position is necessary. However, the optimum position of each shutter 31 or 32 is visually ascertainable. It is assumed to have been reached, when the delineating dark line is clearly present and sharp, and before it begins to widen.

In the present, preferred example the angle $\theta$ was found to lie in a range between 40°–60°. A value of about 45° is presently used in the described apparatus, however, its numerical value is not considered to be as important as the fact that by proper adjustment of the shutters 31 and 32 a sharply defined black diffraction line delineating the inner wall 21 has been achieved.

Factors which may for instance affect the dark lines 33 and 34 in other embodiments of the present invention, may be the wall thickness of the tube or envelope 12, the type of transparent material to the extent that a different material may have a different index of refraction, or even the intensity of the source 25. Consequently, when reference is made to the critical angle at which to locate the shutters, the angle between the two above-identified planes referred to is the angle at which the dark line 33 and 34 clearly delineate the inner wall.

Figure 4:
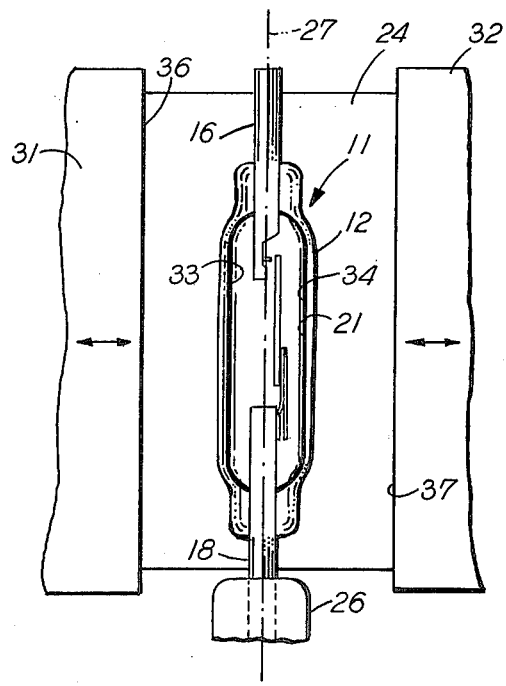
FIG. 4 is a front view of the apparatus shown in FIG. 2.

Referring to FIG. 4, the inner wall of the envelope is delineated by the dark lines 33 and 34 which have merged into the outline 41 of the inner wall 21 within the confines of the envelope 12. FIG. 4 shows the shutters 31 and 32 partially interposed between the diffused light source 25 and the article 11, thereby blocking a portion of the peripheral light emanating from the source 25. The article 11 is mounted in an upright position in the holder 26. In this position an optical viewing apparatus (not shown) may include a gauging or measuring scale or mask such as the template of an optical comparator.

In a preferred embodiment, the described apparatus 22 is used in conjunction with a video viewing and measuring system, such as the one described in U.S. Pat. No. 3,679,820 to L. J. Montone. In such a system an image of the article 11 is projected onto a video screen. Commercial video equipment is widely available for such a purpose. The measuring system disclosed in the U.S. Pat. 3,679,820 can be used to determine whether or not acceptable gaps exist between the free end of the armature 17 and the pole piece 16 and also between the inner wall and the armature 17 of the article 11. It is through the use of the present invention that deviations on the inner wall 21 of the envelope 12 have first been made visible. They are attributed to a glass flow at the time of bonding the polepiece 16 and the stem 18 into the envelope 12.

It should be understood that changes and variation in the disclosed embodiment are possible without departing from the spirit and scope of the invention.

What is claimed is:

1. A method of determining an inner surface of a hollow cylindrical article, the article being substantially transparent to at least some form of radiating energy, the method comprising:
   positioning the article between a diffused source of such radiating energy and a quantitative sensor of such radiating energy;
   orienting a longitudinal axis of the article into a first plane perpendicular to a sensing axis between the source and the sensor; and
   positioning at least one energy absorbing shutter in a second plane perpendicular to the sensing axis and located between the article and the source, the shutter having an edge substantially parallel to the inner surface of the article, the position of the shutter partially blocking radiation emanating peripherally to the sensing axis from the source, thereby casting a shadow image on the inner surface, said shadow image delineating the position of the inner surface to the sensor.

2. A method according to claim 1, wherein the article is a glass tube, the diffused source is a source of diffused light, and the sensor is an optical viewing instrument, and the method comprises positioning an opaque shutter in the second plane, whereby the lateral extent of the inner wall of the glass tube becomes delineated by a dark line.

3. A method according to claim 2, wherein two shutters are positioned in the second plane, one shutter on each side of the viewing axis and the lateral extent of the inner wall of the glass tube becomes delineated on both sides of the sensing axis.

4. A method according to claim 1, wherein the article includes a glass envelope, the diffused source is a diffused source of visible light, and the quantitative sensor comprises a video camera and a video screen, the method further comprising measuring the relationship of at least one wall of the glass envelope with at least one other feature of the article.

5. An apparatus for delineating the position of an inner wall of a transparent hollow cylindrical article, which comprises:
   a holder for mounting the article with its longitudinal axis in a vertical position;
   a source of diffused radiating energy positioned in a plane parallel to and spaced from the longitudinal axis of the article upon the article being mounted in the holder;
   means for viewing the article along a viewing axis perpendicular to the longitudinal axis and to the plane of the source; and
   at least one shutter mounted in a plane parallel to the plane of the source and between the source and the article in a peripheral position to partially block the energy radiating from said source to the article, whereby a dark line delineates the outermost position of the inner wall with respect to the viewing axis.

6. An apparatus according to claim 5, wherein the source is a fluorescent lamp.

7. An apparatus according to claim 6, wherein the means for viewing the article comprises a video camera and a video screen.

8. An apparatus according to claim 6, wherein at least one shutter comprises two shutters, the shutters being mounted on opposite sides of the viewing axis.

9. An apparatus according to claim 8, wherein the shutters have a straight edge facing the viewing axis, the straight edge being substantially parallel to the longitudinal axis of the article.

10. An apparatus according to claim 9, wherein the holder is adapted to receive a mercury-wetted sealed contact switch having a cylindrical glass envelope and electrical elements mounted therein, and the viewing means comprises a video camera mounted to view the switch along the viewing axis, and a video screen for portraying an image of the viewed switch, the viewing means further comprising means for measuring the position of the elements of the switch in relationship to each other and in relationship to the inner wall of the glass envelope of the switch.

* * * * *